United States Patent [19]

Bell et al.

[11] 4,089,848

[45] May 16, 1978

[54] EXTRACTION OF PROTEIN FOOD VALUES FROM OATS

[75] Inventors: Albert Bell, Elginburg; John Roger Brooke Boocock, Kingston; Richard Walton Oughton, Odessa, all of Canada

[73] Assignee: Du Pont of Canada Limited, Montreal, Canada

[21] Appl. No.: 654,163

[22] Filed: Feb. 2, 1976

[30] Foreign Application Priority Data

Feb. 6, 1975 United Kingdom ............... 5055/75

[51] Int. Cl.$^2$ ..................... A23J 1/00; A23J 1/12; C07G 7/00
[52] U.S. Cl. ............................. 260/112 R; 127/29; 127/32; 426/601; 426/602; 426/615; 426/656; 426/565; 536/1; 536/102; 536/114
[58] Field of Search .............. 260/112 R; 127/29, 32

[56] References Cited

U.S. PATENT DOCUMENTS

| | | | |
|---|---|---|---|
| 2,233,439 | 3/1941 | Wahlforss et al. | 260/123.5 |
| 2,377,853 | 6/1945 | Boyer et al. | 260/123.5 |

OTHER PUBLICATIONS

Food Engineering Aug., 1973, pp. 100–102, Cluskey et al.
Cereal Chemistry, vol. 50, No. 4, pp. 475–481 Cluskey et al.
Cereal Chemistry, vol. 50, No. 4, pp. 481–488, Wu et al.
Chem. Abstracts. vol. 82, 1975, 110458f, Wu et al.

*Primary Examiner*—Howard E. Schain

[57] ABSTRACT

A process for the extraction of food values from oats is disclosed. Acid-soluble protein may be obtained by de-oiling comminuted groats, treating the de-oiled groats with an aqueous solution of pH 9.5–11.5, acidifying the alkaline solution after separation of insoluble material to a pH of 1.8–3.2, preferably 2.2–2.8, and separating acid-soluble protein from the acidified solution after separation of insoluble material. Each step in the process is controlled so as to minimize denaturing of acid-soluble protein. Techniques for separation of acid-soluble protein from the acidified solution are disclosed. The separation of other protein products, bran, flour and gum is also disclosed. The use of protein products as emulsifying agents is disclosed.

14 Claims, No Drawings

EXTRACTION OF PROTEIN FOOD VALUES FROM OATS

The present invention relates to the extraction of food values from oats and especially to a process for the separation of, in particular, so-called "acid-soluble protein" from oats. The process is also capable of yielding other useful products. As used herein the term "acid-soluble protein" refers to protein that is substantially soluble in aqueous solutions of pH in the range about 2 to 3.

Products having a high protein content and capable of being used in food may be obtained from a variety of sources, for example, soybeans, cottonseed, wheat, corn, skim milk, white beans and cheese whey. Techniques for the separation of protein from such sources are known. For example, S. J. Circle and A. K. Smith describe processes for the production of high-protein products from soybeans in Chapter 9 of "Soybeans; Chemistry and Technology", AVI Publishing Co. Inc., Westport, Conn., U.S.A., 1972. The production of protein concentrates, starch and residue fractions from oats has been described by J. E. Cluskey et al in Cereal Chemistry 50, 475–481 (1973). The properties of these protein concentrates, starch and residue fractions were described by Y. V. Wu et al in Cereal Chemistry 50, 481–488 (1973). The optimum yield of protein was obtained using an alkali extraction at pH 8.9. After centrifuging the resultant solution the pH of the solution was adjusted to pH 6 and the protein product obtained was freeze-dried.

The properties of the known products of high protein content depend, in particular, on the source of the protein and on the method of separation of the product from the source. Products having properties suitable for some end uses are known but such use of these products may not be economical. For other end uses no suitable products are known.

It is desirable to be able to increase the nutritional value of foods.

Potential end uses for products having high protein contents are in foods, for example, some yogurts and especially beverages, that are acidic, for example, beverages having a pH of less than 4.0. Such beverages include a large number of the so-called soft drinks which are sold throughout the world in very large quantities and the beverages that are more commonly consumed during breakfast, for example, orange juice and the like. If untreated protein products, i.e., products that are not completely acid-soluble, are used in acidic beverages, the beverage would likely contain a suspension of insoluble matter which would have limited stability and tend to gel or settle on standing. Protein products that are soluble in the medium in which they are used are therefore desirable.

Acid-soluble protein may be obtained from cheese whey. However, such protein may exhibit a cheese-like flavour when used at concentrations of about 1% by weight, or higher, in acidic beverages. Concentrations of 2–3% acid-soluble protein may be desired in acidic beverages. In addition, cheese whey is a valuable food additive and it may not be an economic source of protein products. Protein products obtained from soybeans usually require hydrolysis to achieve acceptable solubility in acidic beverages. For example, in U.S. Pat. No. 3,830,942 which issued Aug. 20, 1974, R. L. Howley describes a process for the separation of an acid-soluble protein product from soybeans. Such hydrolysis may affect other useful properties of acid-soluble proteins including the nutritional value of the product. Acid-soluble protein from white beans and wheat tend to be low in nutritional value whereas such protein products obtained from cottonseed require special processing to ensure that the protein is free of toxic components.

Oats are a potentially economic source of high protein products. Such protein products may be acid-soluble or acid-insoluble. Moreover, oats are a potentially economic source of oil, starch, bran and gum, all of which are potentially useful in the food industry. In addition oat hulls may be used as roughage in animal feed or in the production of furfural. However, the known processes for the extraction of oats have only yielded part, for example, less than 60%, of the potentially available protein or have not been adapted for recovery of other potentially useful products that are obtainable from oats in a form suitable for uses other than the feeding of animals.

It has now been found that by extraction of comminuted oats with organic solvents and aqueous alkaline and acidic solutions it is possible to obtain acid-soluble protein in high yield and in addition to obtain other products of potential use in the food industry.

Accordingly, the present invention provides a process for the separation of acid-soluble protein from oats comprising the steps of:

a. comminuting dehulled oats, b. extracting oil from the comminuted groats so obtained using an organic solvent for the oil, c. treating the de-oiled groats so obtained at least once with an aqueous alkaline solution of pH 9.5–11.5 and separating the insoluble material therefrom, d. acidifying the alkaline solution so obtained to pH of 1.8–3.2 and separating the acid-insoluble material therefrom, and e. separating acid-soluble protein from the solution of acid-soluble material, and minimizing the denaturing of acid-soluble protein by carefully controlling the reaction conditions in each of the above steps.

In a preferred embodiment of the process of the present invention the step of separating acid-soluble protein from the solution of acid-soluble material is selected from the group consisting of (i) increasing the pH of the solution of acid-soluble material to 4.2–4.8 and separating the precipitate of acid-soluble protein so formed, and (ii) freeze drying the solution of acid-soluble material.

In another embodiment the organic solvent is hexane, cyclohexane or an aliphatic alcohol of up to 6 carbon atoms, especially 2-propanol.

In yet another embodiment the acids used for acidification are selected from the group consisting of phosphoric acid and hydrochloric acid.

In still another embodiment the alkali used in the process is an alkali metal hydroxide.

In a further embodiment the de-oiled groats are extracted twice with the alkaline solution.

In a still further embodiment the insoluble material obtained in step (c) is treated for the separation of starch, bran, gum and the like therefrom.

The present invention also provides a process for the separation of products from oats comprising the steps of:

i. comminuting dehulled oats, ii. extracting oil from the comminuted groats so obtained using an organic solvent for the oil, iii. treating the de-oiled groats so obtained at least once with an aqueous alkaline solution of pH 9.5–11.5 and separating the insoluble material therefrom, and iv. treating the insoluble material at least once with an aqueous alkaline solution of higher pH than that of step (iii), said higher pH being in the range 11.5–12.5, and separating the insoluble material therefrom, and minimizing the denaturing of acid-soluble protein by carefully controlling the reaction conditions in each of steps (i), (ii) and (iii).

In an embodiment of this process of the invention the insoluble material of step (iv) is treated for the separation of starch and bran.

In another embodiment the liquid of step (iv) after separation of the insoluble material is treated for the separation of gum.

In a further embodiment the liquid of step (iii) after separation of the insoluble material is treated for the separation of acid-soluble protein.

The process of the present invention is carried out on dehulled oats. Techniques for dehulling oats are known in the art. The dehulled oats are comminuted in order to facilitate extraction of oil. Extraction of oil, and of protein, is facilitated by small particle size of the comminuted oats, herein usually referred to as comminuted groats. However, separation of solid material from liquids in the process, e.g., the comminuted groats after de-oiling, is facilitated by large particle size. Thus, the particle size of the comminuted groats should be selected so as to facilitate both the extraction of products from the comminuted groats and the separation of solid material from liquids in the process. The optimum size will depend at least in part on the particular techniques used in the extraction steps and the separation steps in the process. A particle size of about 20 mesh (TYLER* Standard Screen Size) may be a suitable size.

* denotes trade mark

The comminution of the dehulled oats may be accomplished by known techniques, for example, by grinding or by rolling. In order to obtain the desired particle size, it may be desirable to screen out the particles of desired size on, for example, a continuous basis, the groats particles that are oversized being recirculated to the comminution step, or by using air classification techniques.

After comminution the comminuted groats so obtained is de-oiled. If the comminuted groats are not de-oiled the oil may contaminate the protein products subsequently obtained in the process and/or cause other process problems. Such contamination may affect, in particular, the stability of the protein products, e.g., rancidity may occur. Moreover, the oil itself may be a commercially viable product, for example, as a vegetable oil. The de-oiling of the comminuted groats is accomplished with an organic solvent for the oil. The organic solvent must be such that under the process conditions the protein in the comminuted groats is not significantly de-natured. The nature of the oil that is extracted will depend at least in part on the particular organic solvent used and on the other process conditions. Examples of solvents that may be used to de-oil the comminuted groats are hexane, cyclohexane and aliphatic alcohols of up to 6 carbon atoms, e.g., 1-butanol. Preferred solvents are 2-propanol and hexane. The use of 2-propanol is disclosed in the copending application of J. R. B. Boocock and R. W. Oughton filed on the same day as the present application. The solvent may be pure solvent or an azeotropic solvent/water mixture. Techniques for the extraction of oil are known, for example, by passing solvent through a bed of comminuted groats or by forming a slurry of the comminuted groats and solvent. The oil, after separation from the solvent, may be treated for sale, for example, as a vegetable oil, or other use. The de-oiling may be carried out at room temperature but elevated temperatures may also be possible. De-oiling is continued until the oil content of the comminuted groats is reduced to the desired level, for example, 0.2% by weight of the groats. After de-oiling the de-oiled groats so obtained are separated from the solvent.

The de-oiled groats are treated with an aqueous alkaline solution of pH of about 9.5–11.5. Solutions of lower pH are inefficient for the extraction of protein. Solutions of higher pH may denature the protein. In this treatment in alkaline solution protein and some other alkali-soluble materials, e.g., some of the gum, are extracted from the de-oiled groats. Starch, fibrous matter and other matter including some gum are insoluble in the alkaline solution. Preferably, the pH of the alkaline solution is about 11. The matter extracted from the de-oiled groats, and thus the properties of the extracted matter, may depend on the particular alkaline solution. Hydroxides of alkali metals, especially sodium and potassium, ammonium hydroxide and calcium hydroxide are capable of extracting protein from the de-oiled groats. Sodium and potassium hydroxide are preferred. After the treatment with the alkaline solution, insoluble material is separated from the solution. The solid may be subjected to a further treatment with an alkaline solution so as to extract more protein. Subsequently, the remaining solid material is separated from the solution, this solution being combined with the solution from the first alkaline treatment. The alkali-insoluble material, which may be subjected to further alkaline treatments, may subsequently be treated for separation into its constituents. Such separation of the alkali-insoluble material, which may be referred to herein as the starch and bran fraction, is described hereinafter.

Techniques for liquid/solid separation are known. A typical example involves the use of a centrifuge. The use of a centrifuge may be the preferred technique especially if the particle size of the solid matter is very fine.

The pH of the solution from the alkaline treatment is adjusted to a pH of about 1.8–3.2, preferably 2.2–2.8, using an acid that does not substantially denature the protein. Examples of suitable acids are phosphoric acid and hydrochloric acid; sulphuric acid and acetic acid would not appear to be suitable. Citric acid and fumaric acid may be used but may be undesirable on economic grounds. A fraction of the matter in the solution is insoluble at such pH's and this insoluble fraction, which may be referred to hereinafter as the conventional isolate, may be separated from the acid soluble fraction. Known solid/liquid separation techniques, especially the use of a centrifuge, may be used to separate the conventional isolate from the solution. Conventional isolate may be vendible as a protein food additive, as animal feed or as an emulsifying agent.

The pH of the acid solution may be adjusted to 4.2 to 4.8 so as to cause the precipitation of the so-called acid-soluble protein. The optimum pH for isoelectric precipitation is believed to be about 4.5. Alkali metal hydroxides and ammonium hydroxide are suitable for this adjustment of pH. The precipitated acid-soluble protein may be separated from solution by known techniques, especially the use of a centrifuge. The solution is believed to contain some protein as well as gum, sugars and the like. The solution may be recycled so as to separate the protein more efficiently. The other materials in the solution are capable of being separated.

The acid-soluble protein is also separable from the acidic solution at pH's of less than 4.2, e.g., by removal of water.

In a preferred embodiment the acid-soluble protein is obtained by freeze drying a solution of acid-soluble protein of pH of about 1.8-3.2, preferably 2.2-2.8, as is exemplified hereinafter. Alternatively, the acid-soluble protein may be useful without separation from solution.

The wet acid-soluble protein may be dried by, for example, freeze drying, vacuum drying or spray drying. The properties of the dried acid-soluble protein may be dependent to some extent on the drying technique used. The acid-soluble protein is capable of being used in foods as an emulsifying agent and, in particular, in acidic beverages. Acid-soluble protein may be used as an emulsifying agent under acidic conditions, and hence is termed an acid-specific emulsifying agent.

The starch and bran fraction may be treated with an alkaline solution that is of higher pH, in the range 11.5-12.5, than that of the alkaline solution used to treat the de-oiled groats. Preferably the alkaline solution is of a pH of about 12. Alkali metal hydroxides are the preferred basic materials for this solution. In such a treatment the remaining gum and essentially all of the remaining protein in the starch and bran fraction goes into solution and the remaining solid material is comprised of starch and a fibrous material. If the solids are separated from this alkaline solution using centrifuging techniques the solids may be partially separated into two fractions, a starch fraction and a fibrous or "bran" fraction. Further separation may be effected by using a 60 mesh (TYLER) screen, the fibrous or bran fraction being retained on the screen. The material passing through the screen is primarily starch. A protein-containing precipitate may be obtained from the solution so obtained by adjusting the pH to 4.5 with say phosphoric acid. After separation from the protein-containing precipitate, the solution may be mixed with an aliphatic alcohol, e.g., methanol, whereby a "gum" fraction is obtained as a precipitate. This gum is believed to be of potential use in the food industry where viscous materials are required, for example, as a binder in ice cream. The bran may be used as animal feed. The starch is believed to be vendible for end uses in which known starch is used, e.g., the cosmetic, pulp and paper, and food industries. The starch may also be hydrolyzed to sugars. The protein-containing precipitate may be used as an emulsifying agent as in exemplified hereinafter.

The products of the process of the present invention are capable of being used as such in foodstuffs as is discussed herein. Matter derived from the products of the process of the present invention is also capable of being used in foodstuffs. Such matter may be obtained by subjecting the products to further treatment by physical means e.g. sieving, air classification, and/or by chemical means e.g. by further extractions, separations and the like, as is discussed herein and/or is known in the art.

The process of the present invention is illustrated by the following examples:

EXAMPLE I a. De-oiling of Groats

A dehulled oat, known as Hinoat and obtained from Agriculture Canada, Ottawa, Ontario, was ground to −20 mesh (TYLER Standard Screen Size). 240 g of the ground groats obtained was extracted with 1800 ml of hexane for six hours on a modified Soxhlet extraction apparatus. The modified Soxhlet apparatus permitted the ground groats to be continuously extracted by fresh solvent (hexane) at ambient temperature. After the six hours extraction had been completed, the de-oiled groats obtained was first dried in air and then under vacuum (63.5 cm Hg) to remove residual hexane. The de-oiled groats were stored in a refrigerator at about 1° C. The amount of oil extracted was approximately 4.7%, by weight, of the ground groats.

b. Extraction of Protein

About 20 g of the de-oiled groats were admixed, in the form of a slurry, with 100 ml of distilled water and the pH of the slurry was adjusted to 10.0 using a 1N sodium hydroxide solution. The slurry was continuously agitated. Additional sodium hydroxide solution was added periodically so as to maintain the pH at 10.0.

After one hour the slurry was centrifuged for 15 minutes using a laboratory centrifuge. A good separation of solid material and supernatant liquid was obtained at the 1500 G generated by the centrifuge. The alkaline supernatant liquid was decanted from the solid material. The solid material was then re-slurried with a sodium hydroxide solution for a further hour using the above procedure. Adjustment of the pH was required infrequently, if at all. The slurry was centrifuged for 15 minutes and the alkaline supernatant liquid decanted from the solids. These solids are referred to in the Examples as "alkali-insoluble material".

The pH of the first alkaline supernatant liquid was adjusted to 2.6 using a 50% phosphoric acid solution. The solution was centrifuged for 15 minutes and the acidic supernatant liquid decanted from the solid material obtained. This solid material is referred to in the Examples as "conventional isolate A". The pH of the acidic supernatant liquid was adjusted to 4.5 using a 30% potassium hydroxide solution to precipitate protein. The resultant solution was centrifuged for 15 minutes and the supernatant liquid obtained was discarded. The solid material is referred to in the Examples as "acid-soluble protein A".

The second alkaline supernatant liquid was treated in the same manner as the first alkaline supernatant liquid. The solid materials obtained are referred to in the Examples as "conventional isolate B" and "acid-soluble protein B" respectively.

The alkali-insoluble material was admixed, in the form of a slurry, with 100 ml of water. The pH of the slurry was adjusted to 12 using a 30% potassium hydroxide solution. After stirring continuously for one hour the slurry was centrifuged for 15 minutes. The solid material obtained is referred to in the Examples as the "starch/bran fraction". The pH of the supernatant liquid was adjusted to a pH of 4.5 in order to precipitate any protein. This is referred to, in Example XV, as "insoluble protein". The solution was centrifuged for 15 minutes. The supernatant liquid obtained was mixed with 300 ml of methanol in order to precipitate a gum fraction. The gum fraction, referred to in the examples as "gum", was separated by centrifuging for 15 minutes.

All solid samples were dried by freeze-drying under vacuum.

The results reported hereinafter are based on the weight of ground groats as follows $$\% \text{ Product} = \frac{\text{wt. product}}{\text{wt. de-oiled groats}} \times \frac{\text{wt. de-oiled groats}}{\text{wt. groats}} \times 100$$

Thus, although the extraction of protein was carried out on a weighed sample of de-oiled groats the results are expressed as a percentage of the equivalent weight of the ground groats. The ground groats contained approximately 9% water.

The protein in the samples was determined using a Kjeldahl analysis for nitrogen and multiplying the result obtained in per cent nitrogen by the frequently accepted factor of 6.25 to give protein. Acid-soluble proteins A and B were combined before the protein in the acid-soluble protein was measured. The percentage of protein recovered in the acid-soluble protein is defined as:

$$\% \text{ Protein Recovered in Acid-Soluble Protein} = \frac{\text{wt. acid-soluble protein} \times \% \text{ protein in acid-soluble protein}}{\text{wt. ground groats} \times \% \text{ protein in ground groats}} \times 100$$

The results are given in TABLE I as Run 1.

EXAMPLE II

To demonstrate the effect of varying the pH of the alkaline solution, the procedure of Example I was repeated except that the treatment with the alkaline solution waas carried out, in separate runs, at pH's of 9, 11 and 12.

The results are given in TABLE I as Runs 2, 3 and 4.

EXAMPLE III

To demonstrate the effect of the acid used to adjust the pH of the supernatant liquid, obtained on treatment with the alkaline solution, from 10.0 to 2.6, the procedure of Example I was repeated except that the phosphoric acid solution was replaced with solutions of hydrochloric acid (Run 5), sulphuric acid (Run 6), citric acid (Run 7), fumaric acid (Run 8) and acetic acid (Run 9). These acids were used at concentrations similar to that of the phosphoric acid of Example I.

The results of these runs are given in TABLE II.

EXAMPLE IV

To demonstrate the effect of the type of alkali used in the alkaline treatment step, the procedure of Example I was repeated except that the sodium hydroxide solution was replaced with solutions of calcium hydroxide (Run 10), potassium hydroxide (Run 11) and ammonium hydroxide (Run 12).

The results of these runs are given in TABLE III.

EXAMPLE V

To demonstrate the effect of the solvent used in the de-oiling of the ground groats, the procedure of Example I was repeated using de-oiled groats that had been obtained by de-oiling ground groats with methanol (Run 13), ethanol (Run 14), 2-propanol (Run 15), 1-propanol (Run 16) and t-butanol (Run 17).

The results of these runs are given in TABLE IV.

EXAMPLE VI

To demonstrate the effect of temperature of the solvent used in the de-oiling of the ground groats, the procedure of Example I was repeated except that the ground groats were de-oiled with hexane at 68° C.

The results are given in TABLE V as Run 18.

EXAMPLE VII

In the procedure of Example I the oat was ground to −20 mesh. Approximately 15% of such ground groats were capable of passing through a 60 mesh screen. To demonstrate the effect of the particle size of the ground groats the procedure of Example I was repeated using oat that had been ground so that 50% would pass through a 60 mesh screen.

The results are given in TABLE V as Run 19.

EXAMPLE VIII

The procedure of Example I was repeated except that the de-oiled groats were treated three times with an alkaline solution of sodium hydroxide at pH 11.

The results are given in TABLE V as Run 20.

EXAMPLE IX

The procedure of Example I was repeated except that all volumes of the liquids used in the "extraction" steps were increased by a factor of two. The control of the pH of the solutions, where applicable, resulted in small deviations from this factor for the increase in volume.

The results are given in TABLE V as Run 21.

EXAMPLE X

To demonstrate the importance of the alkaline treatment step, the procedure of Example I was repeated except that the alkaline treatment step was omitted. The de-oiled groats were admixed, in the form of a slurry, with 100 ml of water and the pH of the slurry was adjusted to 2.6 with phosphoric acid. Two extractions were carried out at pH 2.6. The pH of the supernatant liquid obtained on centrifuging was adjusted to pH 4.5 and the acid-soluble protein was separated as in Example I.

The results are given in TABLE VI as Run 22.

EXAMPLE XI

For comparative purposes an alternate procedure for the separation of acid-soluble protein was tested. De-oiled groats were treated with 100 ml of water at a pH of 7.0 for a period of one hour to remove some of the gum. After centrifuging the remaining solid material was treated once with a sodium hydroxide solution of pH 9.0 using the procedure of Example I. The resulting solution was centrifuged and the pH of the supernatant liquid was adjusted to 5.0 with phosphoric acid. The precipitate obtained was separated from the solution using a centrifuge and mixed with 100 ml of water. The pH of the slurry obtained was then adjusted to 2.2 using phosphoric acid. After stirring for 5 minutes the resulting solution was centrifuged and the pH of the supernatant liquid was adjusted to 7.0 using sodium hydroxide. The precipitate of acid-soluble protein obtained was separated using a centrifuge.

The results are given in TABLE VI as Run 23.

EXAMPLE XII 1.0 g of the acid-soluble protein of Example I was admixed, in the form of a slurry, with 100 ml of distilled water in a WARING* blender for 15 seconds. The pH of the slurrry was then adjusted to 2.0 using phosphoric acid. The slurry was then returned to the blender for a further 15 seconds. The resulting solution was centrifuged and the protein content of the supernatant liquid was determined by Kjeldahl analysis for nitrogen. 85.6% of the protein in the acid-soluble protein was in the supernatant liquid.

* denotes a trade mark

When the procedure was repeated using a slurry of pH 3.0, 76.0% of the protein was in the supernatant liquid.

EXAMPLE XIII

The starch-bran fraction of Run 18 was slurried with water and sieved through a 60 mesh screen. 82.5% of the starch-bran fraction passed through the screen. This fraction of small particle size is believed to be mainly comprised of starch.

When the above procedure was repeated using the starch-bran fraction of Run 20, 84.9% passed through the 60 mesh screen.

EXAMPLE XIV

The starch-bran fraction of Run 19 was sieved through a 60 mesh screen while in a dry state. 85.7% of the starch-bran fraction passed through the screen.

When the above procedure was repeated using the starch-bran fraction of Run 15, 80.7% passed through the 60 mesh screen.

EXAMPLE XV

Approximately 1 part, by weight, of a protein product was stirred with 99 parts of water having a desired pH until solution or dispersion had been achieved. An equal volume of household vegetable oil was added and the mixture was blended using a WARING blender. The emulsion so formed was poured into a cylindrical glass container and the height of the aqueous layer formed at the bottom of the emulsion was measured periodically, the results being expressed as a percentage of the total height of the emulsion layer/water layer in the glass container.

The results are given in TABLE VII.

EXAMPLE XVI 40 grams of dehulled Hinoat oat that had been comminuted and de-oiled were admixed with 200 ml of water in the form of a slurry. The pH of the slurry was adjusted to 10.0 by the addition of a 1N solution of sodium hydroxide. After one hour the slurry was centrifuged for 15 minutes. The liquid was removed by decantation and admixed with a solution of 50% phosphoric acid until the pH of the resultant solution was 2.6. The solution was then centrifuged to remove any solid material and freeze dried at ambient temperature. 8.39 grams of a white material, a protein concentrate, containing 68.1% protein (measured by macro Kjeldahl analysis) was obtained. The protein concentrate was whiter than "acid-soluble protein A", i.e., the solid material obtained by precipitation of protein at a pH of 4.5 instead of by freeze drying (see Example I). A taste test of a solution of pH 2.6 of the freeze-dried protein concentrate indicated significantly less "mouthfeel" and sensation of suspended particulate matter compared with that obtained in a taste of a solution of pH 2.6 of acid soluble protein A.

In order to determine the solubility of the protein in the freeze-dried protein concentrate, 0.8 g of protein concentrate were admixed with 80 ml of distilled water in a WARING blender so as to form a slurry. The pH of the slurry was adjusted to that desired by the addition of either phosphoric acid or sodium hydroxide. After 15 minutes the resulting solution was centrifuged to remove any remaining solid matter, decanted and analyzed for protein using macro Kjeldahl analysis. The results were as follows:

| pH of Solution | Solubility of Protein (%) |
|---|---|
| 1.99 | 100 |
| 3.24 | 100 |
| 3.93 | 92 |
| 5.19 | 19 |
| 5.99 | 19 |
| 6.94 | 19 |
| 8.02 | 19 |
| 9.06 | 28 |

TABLE I

| Run Number | 1 | 2 | 3 | 4** |
|---|---|---|---|---|
| Alkaline Treatment at pH | 10 | 9 | 11 | 12 |
| Conventional Isolate (wt.%) (total of A and B) | 0.6 | 0.7 | 0.9 | — |
| Acid-soluble Protein (wt.%) | | | | |
| A | 15.5 | 10.3 | 14.5 | — |
| B | 1.6 | 3.4 | 3.2 | — |
| Total | 17.1 | 13.7 | 17.7 | — |
| Starch-bran Fraction (wt.%) | 56.2 | 54.9 | 61.0 | — |
| Gum (wt.%) | 0.6 | 0.7 | 3.3 | — |
| Protein in Starch-bran Fraction (%)* | 3.1 | 3.9 | 3.4 | — |
| Protein in Acid-soluble Protein (%)* | 91.9 | 91.3 | 86.3 | — |
| Protein Recovered in Acid-soluble Protein (%) | 74.9 | 57.5 | 66.2 | — |

*by Kjeldahl Analysis
**Separation of solid material and liquid after first alkaline treatment was not achieved using a centrifuge.

TABLE II

| Run Number | 5 | 6 | 7 | 8 | 9 |
|---|---|---|---|---|---|
| Acid | hydrochloric | sulphuric | citric | fumaric | acetic |
| Conventional Isolate (wt. %) (total of A and B) | 1.1 | 16.2 | 0.9 | NA | 0.7 |
| Acid-soluble Protein (wt. %) | | | | | |
| A | 14.9 | 2.1 | 18.3 | 11.6 | 20.6 |
| B | 1.7 | 0.0 | 1.8 | 1.1 | 2.5 |
| Total | 16.6 | 2.1 | 20.1** | 12.7 | 23.1* |
| Starch-bran Fraction (wt. %) | 53.5 | 46.6 | 57.4 | 56.8 | 55.6 |
| Gum (wt. %) | 1.0 | 0.9 | 0.9 | 1.2 | 0.6 |
| Protein in Starch-bran Fraction (%) | 3.4 | 3.2 | 3.3 | 3.5 | 2.8 |
| Protein in Acid-Soluble Protein (%) | 95.2 | 91.0 | 79.3 | 94.4 | 65.4 |
| Protein Recovered in Acid-soluble | | | | | |

TABLE II-continued

| Run Number | 5 | 6 | 7 | 8 | 9 |
|---|---|---|---|---|---|
| Acid | hydrochloric | sulphuric | citric | fumaric | acetic |
| Protein (%) | 73.1 | 8.6 | 76.1 | 57.8 | 72.1 |

*protein was badly discoloured.
**product contained citric acid.
NA not available

TABLE III

| Run Number | 10 | 11 | 12 |
|---|---|---|---|
| Alkali | calcium hydroxide | potassium hydroxide | ammonium hydroxide |
| Conventional Isolate (wt. %) (total of A and B) | 1.5 | 1.8 | 2.1 |
| Acid-soluble (wt.%) | | | |
| A | 15.6 | 16.6 | 13.7 |
| B | 5.4 | 1.1 | 2.1 |
| Total | 21.0* | 17.7 | 15.8 |
| Starch-bran Fraction (wt. %) | 60.2 | 54.8 | 55.7 |
| Gum (wt. %) | 1.7 | 1.3 | 2.1 |
| Protein in Starch-bran Fraction (%) | 3.6 | 2.4 | 2.8 |
| Protein in Acid-soluble Protein (%) | 47.1 | 87.4 | 88.3 |
| Protein Recovered in Acid-soluble Protein (%) | 49.3 | 77.4 | 69.7 |

*product contained calcium hydroxide

TABLE IV

| Run Number | 13 | 14 | 15 | 16 | 17 |
|---|---|---|---|---|---|
| De-oiling Solvent | methanol | ethanol | 2-propanol | 1-propanol | t-butanol |
| Oil Separated from Ground Groats (wt.%) | 4.52 | 4.45 | 5.93 | 5.22 | 3.58 |
| Conventional Isolate (wt. %) (total of A and B) | 0.7 | 0.4 | 1.2 | 0.7 | 0.5 |
| Acid-soluble Protein (wt. %) | | | | | |
| A | 17.4 | 16.7 | 15.3 | 14.6 | 15.9 |
| B | 2.0 | 1.2 | 2.1 | 1.9 | 1.4 |
| Total | 19.4 | 17.9 | 17.4 | 16.5 | 17.3 |
| Starch-bran Fraction (wt. %) | 56.5 | 56.9 | 57.3 | 57.0 | 57.1 |
| Gum (wt. %) | 0.6 | 0.7 | 0.8 | 1.4 | 1.0 |
| Protein in Starch-bran Fraction (%) | 3.8 | 3.3 | 3.1 | 3.4 | 3.2 |
| Protein in Acid-soluble Protein (%) | 88.3 | 90.8 | 91.9 | 94.9 | 90.6 |
| Protein Recovered in Acid-soluble Protein (%) | 81.6 | 71.3 | 67.7 | 65.9 | 55.3 |

TABLE V

| Run Number* | 18 | 19 | 20 | 21 |
|---|---|---|---|---|
| Conventional Isolate (wt.%) (total) | 0.8 | 1.0 | 1.2 | 0.8 |
| Acid-soluble Protein (wt.%) | | | | |
| A | 13.6 | 13.9 | 14.7 | 14.5 |
| B | 2.8 | 3.2 | 3.0 | 1.4 |
| C** | | | 0.2 | |
| Total | 16.4 | 17.1 | 17.9 | 15.9 |
| Starch-bran Fraction (wt.%) | 54.0 | 53.3 | 53.6 | 52.2 |
| Gum (wt. %) | 2.8 | 2.0 | 1.5 | 1.0 |
| Protein in Starch-bran Fraction (%) | 3.4 | 3.3 | 3.1 | 3.8 |
| Protein in Acid-soluble Protein (%) | 84.4 | 83.8 | 86.6 | 91.1 |
| Protein Recovered in Acid-soluble Protein (%) | 62 | 66 | 70 | 66.8 |

*see Examples VI–IX for procedure
**Acid-soluble protein obtained as a result of third treatment in Example VIII.

TABLE VI

| Run Number | 22 | 23 |
|---|---|---|
| Conventional Isolate (wt.%) | | 0.4 |
| Acid-soluble Protein (wt.%) | | |
| A | 8.8 | 19.4 |
| B | 0.1 | |
| Total | 8.9 | 19.4 |
| Starch-bran Fraction (wt.%) | 73.7* | 62.3 |
| Protein in Acid-soluble Protein (%) | 77.8 | 60.5 |
| Protein Recovered in Acid Protein (%) | 28.7 | 58.7 |

*Fraction remaining after acid extraction.

TABLE VII

| Protein Product* | Solution pH | Separation of Emulsion as a percentage after | | | | | | |
|---|---|---|---|---|---|---|---|---|
| | | 0.16 | 0.25 | 0.50 | 1.0 | 18.0 | 48.0 | hours |
| Acid-soluble Protein | 7 | 27 | | | | | | |
| Acid-soluble Protein | 2.6 | | | | 7 | 22 | 22 | |
| Acid-soluble Protein** | 2.6 | | 0 | 4 | 14 | 24 | | |
| Conventional Isolate | 7 | | | 5 | | 26 | | |
| Insoluble Protein | 7 | | | | 0 | | | |
| Acid-soluble Soybean Protein | 7 | | 25 | | | | | |
| Soybean Conventional Isolate | 7 | | | small | | | | |

*derived from oats unless specified otherwise
**Acid-soluble protein made from oats that were not de-oiled.

The embodiments of the invention in which an exclusive property or privilege is claimed are defined as follows:

1. A process for the separation of acid-soluble protein from oats comprising the steps of:

a. comminuting dehulled oats, b. extracting oil from the comminuted groats so obtained using an organic solvent for the oil, c. treating the de-oiled groats so obtained at least once with an aqueous alkaline solution of pH 9.5–11.5 and separating the insoluble material therefrom, d. acidifying the alkaline solution so obtained to a pH of 1.8–3.2 and separating the acid-insoluble material therefrom, and e. separating acid-soluble protein from the solution of acid-soluble material, whereby an acid-soluble protein that is not significantly denatured is obtained.

2. The process of claim 1 in which the step of separating acid-soluble protein from the solution of acid-soluble material is selected from the group consisting of (i) increasing the pH of the solution of acid-soluble material to 4.2–4.8 and separating the precipitate of acid-soluble protein so formed, and (ii) freeze drying the solution of acid-soluble material.

3. The process of claim 2 in which, in step (b), the organic solvent is selected from the group consisting of hexane, cyclohexane, commercial heptane and aliphatic alcohols of 1 to 6 carbon atoms.

4. The process of claim 3 in which, in step (c), the alkaline solution is a solution of an alkali selected from the group consisting of alkali metal hydroxides, calcium hydroxide and ammonium hydroxide.

5. The process of claim 4 in which, in step (d), the alkaline solution is acidified with a solution of an acid selected from the group consisting of phosphoric acid, hydrochloric acid, fumaric acid and citric acid.

6. The process of claim 2 in which the step of separating acid-soluble protein from the solution of acid-soluble material comprises increasing the pH of the solution of acid-soluble material to 4.2–4.8 and separating the precipitate of acid-soluble protein so formed.

7. The process of claim 6 in which in step (b) the organic solvent is selected from the group consisting of hexane, commercial heptane, 2-propanol and 1-butanol, in step (c) the alkaline solution is a solution of sodium or potassium hydroxide and in step (d) the acid is phosphoric acid or hydrochloric acid.

8. The process of claim 7 in which the solvent is hexane and the acid is phosphoric acid.

9. The process of claim 2 in which the step of separating acid-soluble protein from the acid-soluble material comprises freeze drying the solution of acid-soluble material.

10. The process of claim 9 in which in tep (b) the organic solvent is selected from the group consisting of hexane, commercial heptane, 2-propanol and 1-butanol, in step (c) the alkaline solution is a solution of sodium or potassium hydroxide and in step (d) the acid is phosphoric acid or hydrochloric acid.

11. The process of claim 10 in which the solvent is hexane and the acid is phosphoric acid.

12. The process of claim 2 in which the de-oiled groats is extracted twice with the alkaline solution.

13. The process of claim 2 in which the insoluble material obtained in step (c) in treated for the separation of fractions comprised of starch, of bran or of gum.

14. The process of claim 1 in which, in step (d), the pH is in the range 2.2–2.8.

* * * * *